(12) United States Patent
Keenan et al.

(10) Patent No.: US 7,342,918 B2
(45) Date of Patent: Mar. 11, 2008

(54) TRANSACTION CARD INFORMATION ACCESS WEB SERVICE (75) Inventors: Sean M. Keenan, Scottsdale, AZ (US); Bill Turko, Glendale, AZ (US); Bob Morgan, Glendale, AZ (US)

(73) Assignee: American Express Travel Related Services Co., Inc., New York, NY (US)

( * ) Notice: Subject to any disclaimer, the term of this patent is extended or adjusted under 35 U.S.C. 154(b) by 1078 days.

(21) Appl. No.: 10/414,174

(22) Filed: Apr. 15, 2003

(65) Prior Publication Data

US 2004/0208164 A1 Oct. 21, 2004

(51) Int. Cl.
*H04L 12/66* (2006.01)

(52) U.S. Cl. .................. 370/352; 707/100

(58) Field of Classification Search ............ None
See application file for complete search history.

(56) References Cited

U.S. PATENT DOCUMENTS

| | | | |
|---|---|---|---|
| 5,307,411 A | 4/1994 | Anvret et al. |
| 5,604,801 A | 2/1997 | Dolan et al. |
| 5,721,768 A | 2/1998 | Stimson et al. |
| 5,903,652 A | 5/1999 | Mital |
| 6,000,608 A | 12/1999 | Dorf |
| 6,012,049 A | 1/2000 | Kawan |
| 6,073,113 A | 6/2000 | Guinan |
| 6,105,008 A | 8/2000 | Davis et al. |
| 6,199,762 B1 | 3/2001 | Hohle |
| 6,289,324 B1 | 9/2001 | Kawan |
| 6,302,326 B1 | 10/2001 | Symonds et al. |
| 6,317,832 B1 | 11/2001 | Everett et al. |
| 6,343,284 B1 | 1/2002 | Ishikawa et al. |

(Continued)

FOREIGN PATENT DOCUMENTS

WO   WO 02/082305   10/2002

(Continued)

OTHER PUBLICATIONS

International Search Report for PCT/US2004/011476 dated Oct 7, 2004.

(Continued)

*Primary Examiner*—Brian Nguyen
(74) *Attorney, Agent, or Firm*—Fitzpatrick, Cella, Harper & Scinto (57) ABSTRACT

There is provided a platform neutral method and system for retrieving card information in an extensible markup language (XML) format over the internet via a web service comprising the steps of formulating a simple access object protocol (SOAP) request for the selected information at a consumer application, transmitting the SOAP request to the web service over the internet, receiving the SOAP requests at a provider web service, routing the information request for card information to a provider back-end network, processing the information request and retrieving the selected card information and forwarding to the web service application, formatting the retrieved selected card information in an XML format and formulating a SOAP reply, transmitting the SOAP reply to the consumer over the internet, receiving the SOAP reply at a consumer web server application, reading the XML formatted stored value card information, and routing the XML formatted information to a consumer back-end application or end-point access devices.

12 Claims, 5 Drawing Sheets

U.S. PATENT DOCUMENTS

| | | | |
|---|---|---|---|
| 6,397,332 B2 | 5/2002 | Kawano et al. | |
| 6,457,066 B1 | 9/2002 | Mein et al. | |
| 6,473,500 B1 | 10/2002 | Risafi et al. | |
| 6,481,632 B2 | 11/2002 | Wentker et al. | |
| 6,505,171 B1 | 1/2003 | Cohen et al. | |
| 6,510,983 B2 | 1/2003 | Horowitz et al. | |
| 2002/0046184 A1* | 4/2002 | Villaret et al. | 705/64 |
| 2002/0046341 A1* | 4/2002 | Kazaks et al. | 713/182 |
| 2002/0065712 A1* | 5/2002 | Kawan | 705/14 |
| 2002/0065784 A1* | 5/2002 | Ranzini et al. | 705/64 |
| 2002/0152168 A1* | 10/2002 | Neofytides et al. | 705/44 |
| 2002/0152179 A1* | 10/2002 | Racov | 705/67 |
| 2002/0156676 A1* | 10/2002 | Ahrens et al. | 705/14 |
| 2002/0166891 A1* | 11/2002 | Stoutenburg et al. | 235/379 |
| 2002/0174018 A1* | 11/2002 | Bunger et al. | 705/26 |
| 2002/0174030 A1* | 11/2002 | Praisner et al. | 705/26 |
| 2002/0175208 A1* | 11/2002 | Bartley et al. | 235/380 |
| 2002/0190123 A1* | 12/2002 | Anvekar et al. | 235/380 |
| 2002/0194124 A1* | 12/2002 | Hobbs et al. | 705/39 |
| 2002/0194138 A1* | 12/2002 | Dominguez et al. | 705/64 |
| 2003/0033246 A1* | 2/2003 | Slater | 705/39 |
| 2003/0055782 A1* | 3/2003 | Slater | 705/39 |
| 2003/0084001 A1* | 5/2003 | Chang | 705/64 |
| 2003/0208682 A1* | 11/2003 | Zissimopoulos et al. | 713/182 |
| 2003/0229590 A1* | 12/2003 | Byrne et al. | 705/40 |

FOREIGN PATENT DOCUMENTS

WO    WO 03/024054    3/2003

OTHER PUBLICATIONS

Martin G. Nystrom: "Securing Web Services" [Online] Aug. 18, 2002, XP002291164 URL:http://www.shebeen.com/securews/> [retrieved on Aug. 4, 2004].

Security Focus: "Library entry" Security Focus Web Site, [Online] Aug. 18, 2002, XP002291165 Retrieved from the Internet: URL:hh\ttp://www.security focus.com/library/3900> [retrieved on Aug. 4, 2004} (used for dating D2).

Herda S: "non-repudiation: Constituting evidence and proof in digital cooperation" Computer Standards and Interfaces, Elsevier Sequoia, Lausanne, CH, vol. 17, No. 1, 1995, pp. 69-79, XP004046750 ISSN: 0920-5489.

\* cited by examiner

TRANSACTION CARD INFORMATION ACCESS WEB SERVICE

FIELD OF THE INVENTION

The present invention generally relates to computerized information systems and information retrieval from a provider computer system. More particularly, the present invention relates to a system and method for requesting and delivering selected stored value card information in an extensible markup language (XML) format via the internet using a web service that uses simple object access protocol (SOAP) as the communications protocol between the web service provider and consumer.

BACKGROUND OF THE INVENTION

Authorized consumers, merchants or customers often want to check or verify information relating to transaction cards, such as stored value or gift cards. Such information may include the remaining balance on the stored value card or recent transactions carried out using the card. Existing methods of retrieving such information typically require consumers or merchants to authenticate their authorized status and identification at an information providing system or network. In existing methods, authentication for a merchant, consumer or user is generally carried out via Single Sign On (SSO) through a web channel which requires that the merchant access a designated web site, and, once there, to manually key in or enter appropriate information and data so that desired or selected card information can be correctly requested and retrieved.

Also, merchants or consumers are typically required to complete an authentication procedure multiple times on their own computerized network and on the information provider's computerized network. Typically, a merchant initially authenticates identifications (ID) and passwords for authorized users to use the merchant network. This can be cumbersome and time consuming for merchants that have many users authorized to request transaction card information. When a merchant or consumer, via an employee or user, accesses a provider website or computing environment, the merchant must also authenticate at the information provider's computing environment or network as noted above. This process can be unduly repetitive and time consuming if a merchant has a large number of users that may require access to the card information since existing information retrieval methods require that all users authenticate at the information provider's network each time transaction card information is requested.

Additionally, existing card information retrieval methods require dedicated communication lines for a continuous connection between the information provider network and the merchant network such that information can be requested and delivered in a reliable and secure manner. The need for dedicated communication lines can result in an information retrieval method and system that is expensive.

Further, many existing information retrieval systems require that both the information providing system and the receiving merchant or consumer system have or operate on the same operating system or platform so that communications and the exchange of information between the systems can be conveniently carried out. This aspect can be a drawback if the operating systems or platforms of the information provider and merchant systems are not the same. In such a case, communication and information retrieval may not be possible or may be very limited due to the differences in system platforms. One solution to this drawback requires one party to procure a computing system having a compatible operating system, platform or interface to the other party's system so that the parties can communicate and exchange information in a reliable and consistent manner. This approach can lead to increased costs for the party procuring the additional computing system and results in one party having two incompatible computing systems.

Moreover, existing information retrieval methods and systems often use communication protocols and data formats that are compatible with the operating system or platform of the information providing system. As a result, the card information received from the information provider typically comes in a format that is compatible with only a limited number of applications and devices on the merchant's network. This is a drawback since the merchant may want to ability to manipulate the received information in a variety of both current and future applications and devices on his system.

There is thus a need for a method and system for accessing or requesting transaction card information in a platform-neutral way from an information provider system and delivering the information to a merchant or consumer system. There is also a need for a method and system for requesting and receiving transaction card information without having to repeatedly authenticate at the information provider's system each time card information is requested. There is also a need for a method and system for requesting and receiving transaction card information and delivering the transaction card information in a standardized format to enable a merchant to receive, process, store, display and manipulate the received transaction card information in a variety of merchant applications and/or to integrate the received information into a variety of existing or new merchant end-point access devices or applications.

SUMMARY OF THE INVENTION

The present invention provides a method for retrieving selected stored value card information in a standard format over a public interconnected network via a provider web service comprising the steps of formulating a simple access object protocol (SOAP) request in a consumer network operating on a first platform, transmitting the SOAP request to the provider web service over the public interconnected network, receiving the SOAP request at a provider web service running a web server application, reading the SOAP request to determine the card information being requested, generating and routing an internal information request for the requested card information to a provider back-end network operating on a second platform, processing the information request and retrieving the selected card information from a storage location and forwarding the retrieved information to the web service application, formatting the retrieved card information in an XML format and formulating a SOAP reply, transmitting the SOAP reply from the web service application to the consumer web server application over the public interconnected network, receiving the SOAP reply at the consumer web server application, reading the SOAP reply to parse out the XML formatted selected card information, and routing the XML formatted selected card information to one or more consumer back-end applications or end-point access devices on the consumer network.

The method for retrieving selected stored value card information in a standard format over a public interconnected network via a provider web service can further comprise the steps of encrypting the SOAP request and providing the SOAP request with a consumer digital signature, verifying that the consumer digital signature on the received encrypted SOAP request corresponds to an authorized consumer and then decrypting the SOAP request, encrypting the SOAP reply and providing the SOAP reply with a provider digital signature, and verifying that the provider digital signature on the received encrypted SOAP reply corresponds to the provider and then decrypting the SOAP reply.

It is an object of the present invention to provide a method and system for requesting and receiving selected XML formatted stored value information via the internet using a web service in a way that allows minimal integration of provider and merchant computer systems and provides a standard interface between both systems.

It is an object of the present invention to provide a method and system for requesting and receiving selected XML formatted stored value card information via a web service directly to a merchant's applications and end point access devices without requiring the merchant to authenticate each time information is requested.

It is an object of the present invention to provide a method and system for a web service that provides the capability for merchants to retrieve and display stored value card transactions processed and stored by a card provider system via the internet at a merchant chosen location such as one or more merchant retail locations.

It is an object of the present invention to provide a method and system for a web service that can provide selected transaction card information to a requesting merchant or consumer, including stored value card transaction history and balance for a specific stored value card or gift card.

It is an object of the present invention to provide stored value card information access to merchants and consumers that use the Internet as the means for transmission of business or other designated information without requiring dedicated communications lines between the provider and merchant or consumer.

It is an object of the present invention to provide a method and system for merchants and consumers to retrieve card information via a standard web service such that independent of the operating system or platform used by the merchant or consumer.

It is an object of the present invention to provide a method and system for a web service that can provide selected information, such as stored value card information, without requiring a merchant or user to authenticate at a provider's system, network or web applications.

It is an object of the present invention to provide a method and system for an information access web service that can provide requested information or data in a standardized XML format to enable and allow convenient integration into a plurality of end point access applications and devices, including, among others, static or dynamic world wide web pages, including among other applications web browsers, intranet, internet, and extranets, Point of Sale (POS) devices, cash registers, personal display assistants (PDAs), smart cards, transaction cards having smart chips or integrated circuit chips, kiosk applications, and back office applications such as Microsoft Office, PowerPoint, Database applications and E-mail applications and other electronic access systems.

It is an object of the present invention to provide a method and system for an information access web service that can use third party proxy applications to initiate connections and provide secure communication and transactions between a provider and merchant or consumer to request and receive selected card information.

It is an object of the present invention to provide a method and system for an information access web service that can use third party proxy applications to generate, track, encrypt, and decrypt simple object access protocol (SOAP) requests and replies for selected information and to transmit SOAP requests and replies over the internet between the web service and the merchant or consumer.

It is an object of the present invention to provide a method and system for information access that can use third party proxy applications to track and store transmitted and received SOAP requests and replies and to generate reports on web service activity.

It is an object of the present invention to provide a method and system for an information access web service that can provide selected transaction card information to a user, consumer or card member without requiring phone calls to or interaction with an integrated voice response (IVR) system or customer service representatives.

It is an object of the present invention to provide a method and system for an automated web service for retrieval of selected transaction card information without requiring interaction with or intervention by a provider customer service representative thereby reducing the time to request and receive the desired card information.

The following drawings and description set forth additional advantages and benefits of the invention. More advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION

One embodiment of the present invention provides a web service that enables authorized merchants or customers to request and receive selected transaction card information over the internet from an information provider system or network in a standard format. The standard format will enable convenient integration of the transaction card information into existing and future consumer applications and end-point access devices or machines.

Using the method and system described herein, a consumer or merchant can request and receive selected transaction card information in an extensible markup language (XML) format via the internet using a web service preferably described in the web services description language (WSDL) that uses simple object access protocol (SOAP) as the communications protocol between the web service provider and merchant or consumer. The system and method of the present invention is platform neutral such that the requesting merchant or consumer systems may function in one platform or operating system and the provider system can operate in a different platform.

Those of skill in the art will readily recognize that the retrieved information can be any information related to transaction cards including card holder information, transaction card history, stored value card balance, card credit limit information or any other transaction card available from the information provider system or network. Additionally, those of skill in the art will readily recognize that the system and method of the present invention can be use to request and retrieve information for any number of well known types of transaction cards including a stored value card, a gift card, a credit card, a smart card, a bank card, a charge card or a financial card.

Figure 1A:
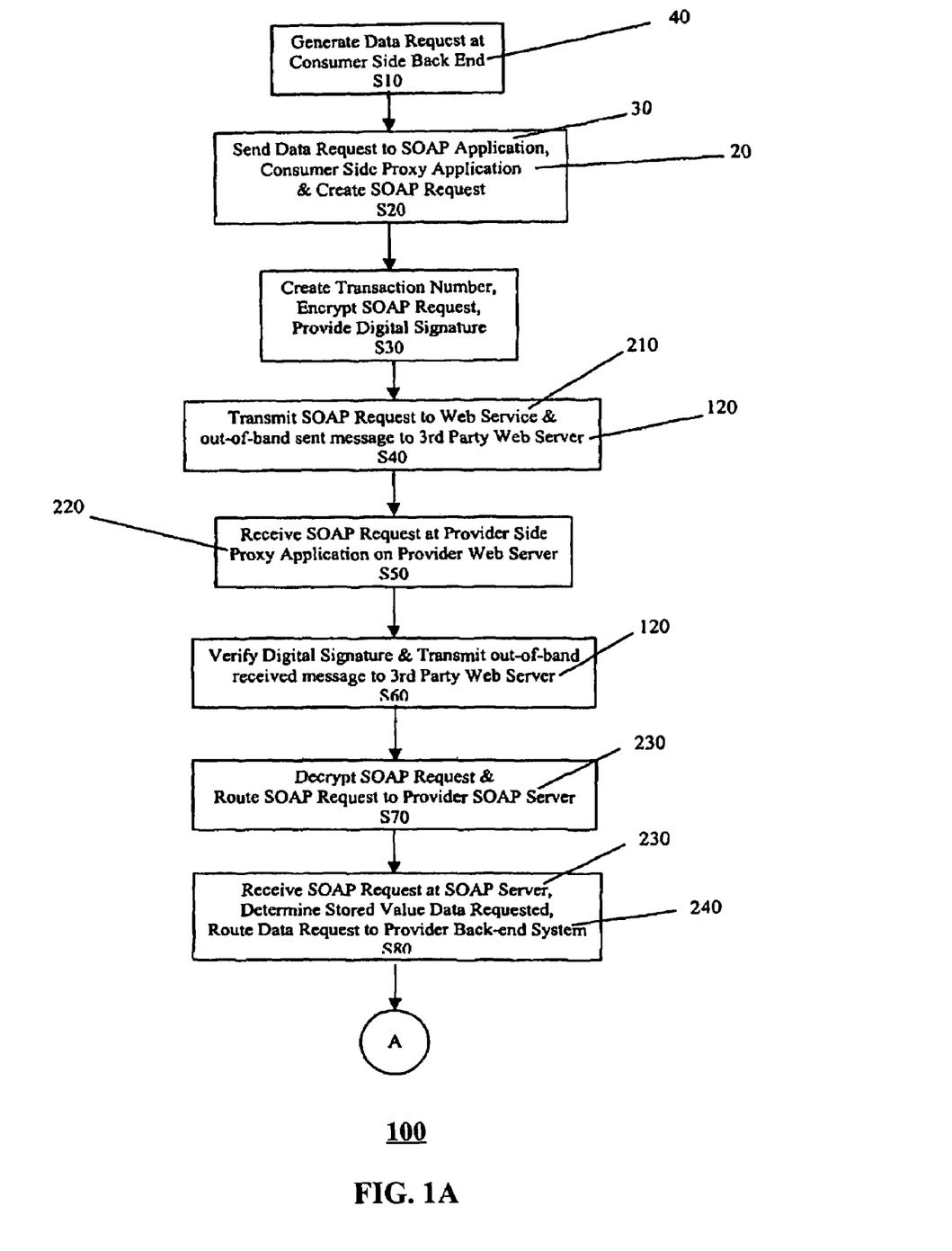
FIGS. 1A and 1B illustrate a flow chart of the steps of one preferred method for requesting and retrieving selected information over the internet via a web service according to the present invention.
Figure 1B:
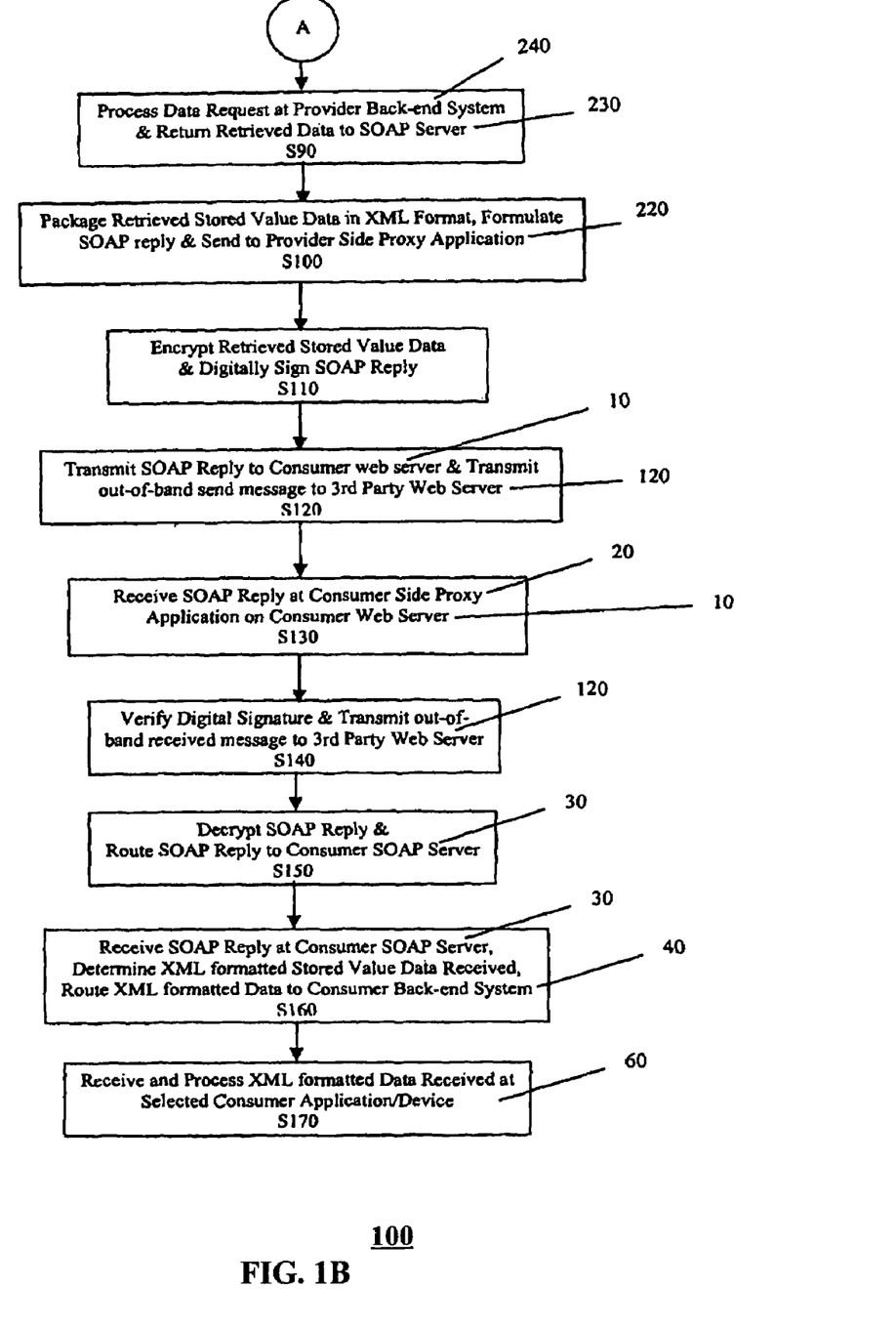
Figure 2:
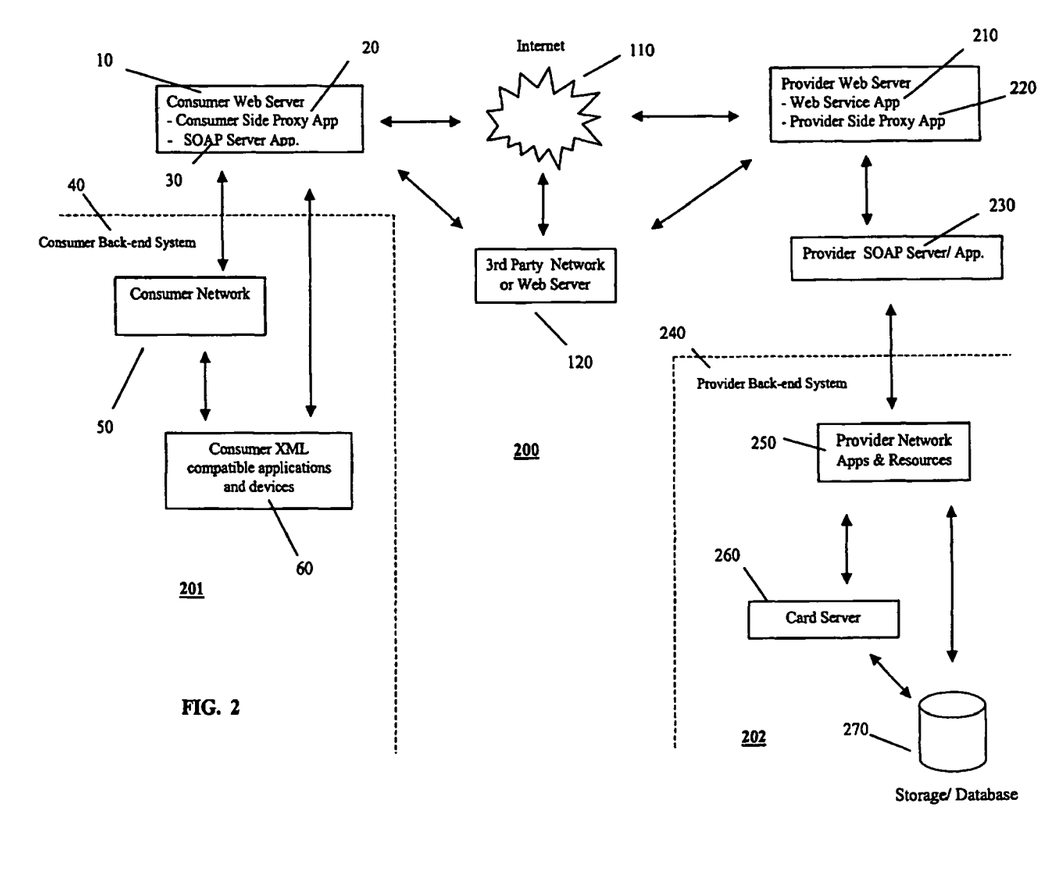
FIG. 2 illustrates a block diagram representation of a system where the method of FIG. 1 can be implemented.

Referring to FIGS. 1A and 1B, there is shown a flow chart with steps for a preferred method 100 for requesting and retrieving stored value information over the internet 110 via a web service 210 according to the present invention. A block diagram of a system 200 where the method 100 of FIGS. 1A and 1B can be implemented is shown in FIG. 2.

In Step S10, a request for selected information is generated at a merchant or consumer back-end system 40 of a merchant or consumer system 201 or first operating system. The information or data request can be generated by a consumer, such as a merchant, at a consumer stored value application 60. The consumer stored value application 60 can be running on any one of a machine, computer or device at a consumer location, such as a merchant retail location. The machine, computer or device can be a card reader, a computer terminal, a Point of Sale (POS) terminal, a cashier terminal, a back-office terminal or any other machine that can generate an information request for transaction card information.

An information request can be initiated or generated at a consumer application or device 60 by methods and means well known to those of skill in the art including swiping the magnetic stripe of a transaction card in a card reader device or by inputting transaction card account information at computer or machine for processing by the consumer application 60. The information request can also be initiated or generated at the consumer application or device 60 via a smart card and smart card reader device as is also well known to those of skill in the art. The smart card can be a transaction card having an embedded smart chip or integrated circuit chip with appropriate applications and data storage capability. The information request generated by the consumer application 60 will have a format corresponding to the operating system or platform of the consumer system 201.

In Step S20, the card information request is passed from the consumer back-end system 40 to a simple object access protocol (SOAP) application 30 running on a consumer web server 10. The card information request can be forwarded to the SOAP application 30 directly from the consumer application 60 that generates the information request or through intermediary resources 50 in the consumer back-end system 40. The SOAP application preferably runs on the consumer web server 10 and comprises computer instructions and/or software that convert the information requests into an extensible markup language (XML) formatted SOAP request. Additionally, if the information request was generated by a smart card or transaction card with a smart chip, those of skill in the art will recognize that the information request may have been generated as an XML formatted SOAP request and thus no conversion may be necessary. The XML formatted SOAP request is now forwarded to a consumer side proxy application 20.

In an alternate embodiment without a SOAP application 30 on the consumer web server 10, the generated information request is forwarded to the consumer side proxy application 20. The information request is forwarded to the consumer side proxy application 20 directly from the consumer application 60 that generates the information request or through intermediary resources 50 in the consumer back-end network 40. Also, the consumer side proxy application 20 comprise computer instructions and/or software to convert the information request into an XML formatted SOAP request.

In Step S30, the XML formatted SOAP request is processed by the consumer side proxy application 20. The consumer side proxy application 20 will generate and assign a transaction number to the SOAP request for tracking and record keeping purposes. The consumer side proxy application 20 will execute an encryption algorithm to encrypt the XML formatted SOAP request. Additionally, consumer side proxy application 20 will add the consumer's digital signature to the SOAP request. Additionally, the consumer side proxy application 20 preferably computes a consumer digital signature for SOAP request message intended for the information provider. The consumer digital signature is then added to the SOAP request payload along with the encrypted message. The consumer side proxy application 20 also possesses decryption capabilities to decrypt SOAP replies received from the provider web service 210.

In this embodiment, the consumer web server 10 has a separate consumer side proxy application 20 and a SOAP server application 30 performing particular functions. However, those of ordinary skill in the art will readily recognize that the functions and capabilities of the consumer side proxy application 20 and the SOAP server application 30 can also be accomplished by code or software for a consumer web server application and that each application can run on one or multiple computing machines.

In Step S40, the encrypted SOAP request is then transmitted to the information provider's web service 210 by the consumer web server application or consumer side proxy application 20. The encrypted SOAP request with the consumer's digital signature is preferably transmitted over a public interconnected network or internet to the provider's web service 210 at a designated uniform resource locator (URL) address. Simultaneously, a separate out-of-band transmission or message is transmitted to a designated third party computer system 120 for recording that a SOAP request for card information was sent from a consumer to the provider at the provider's web service. Those of skill in the art will readily recognize that the third party system 120 can include, among other components and devices, web servers, application servers and databases. Those of skill in the art will also recognize that the out-of-band transmission or message sent to the third party 120 is optional and done as an enhancement aspect. Thus, step S40 can be carried out with or without the out-of-band transmission or message to the third party 120.

Transmission of the encrypted SOAP request for card information over the internet 110 permits the consumer to request desired information over a readily available communications medium without requiring dedicated communications lines between the consumer and the information provider. Additionally, encryption of the message guarantees confidentiality of the transmitted SOAP request message and digital signing of the message guarantees the integrity of the message. Moreover, the use of a standard XML formatted SOAP request, enable the consumer to communicate, request and receive selected card information in a standardized manner independent of the platforms being used by the internal systems of the consumer and the provider. The consumer is thus able to request and the provider is able to deliver transaction card information in cases where the merchant and provider have different or non-compatible operating systems or platforms. The platforms could be among other including Microsoft Windows 2000, Windows NT, Macintosh OS, IBM JAVA operating system, IBM S/390, UNIX, SOLARIS, LINUX and Novell NETWARE among other platforms well known to those of skill in the art.

In Step S50, the web service provider receives the merchant's encrypted XML formatted SOAP request at a provider side proxy application 220 loaded on a provider web server 210. The provider side proxy application 220 and the consumer side proxy application 20 preferably provide similar functions: transmission and receipt of SOAP messages, encryption and decryption of SOAP messages, and insertion and verification of consumer and provider signatures. The proxy applications 20 and 30 are preferably provided by a third party 120 having expertise in software application that provide such transaction and security functions, features and capabilities. Such third parties 120 can include commercial providers that offer these software and software applications to the public, e.g., computer applications provided by a company such as Flamenco Networks located at 400 NorthWinds Center West, 11605 Haynes Bridge Road, Suite 600, Alpharetta, Ga. 30004. However, those of skill in the art will readily recognize that the these functions can be implemented by the consumer and provider through the use of commercially available software that can then be loaded onto the consumer's and provider's web servers. Moreover, those of skill in the art will readily recognize that the consumer and provider proxy applications 20 and 220 used in a preferred method 100 and system 200 are features that provide security for the information being requested and delivered over the internet. As such, the method 100 and system 200 disclosed can function without the use of the proxy applications 20 and 220, albeit with information transactions that may be less secure.

In Step S60, the provider side proxy application 220 verifies the digital signature attached to the SOAP request. The digital signature ensures that the SOAP request message received is from the intended consumer party and that the message has not been and was not tampered with in transit. The provider side proxy application can then verify or confirm that the consumer or merchant sending the SOAP request is authorized to request and receive transaction card information via the web service 210. For example, to confirm that a merchant is authorized to request and receive stored value card information from the information provider's stored value card applications and devices 260 and 270. Once the consumer digital signature is verified, the provider side proxy application 220 generates an out-of-band message and transmits the message to the third party computer system 120 for recordation that the SOAP request was received from the merchant or consumer at the provider's web server 210. Again, those of skill in the art will also recognize that the out-of-band transmission or message sent to the third party 120 is optional and done as an enhancement aspect.

The sent and received messages indicating that SOAP requests were sent and received by the consumer or provider are preferably stored at the third party system 120. This information can later be accessed by either the consumer or provider through a web services network provided by a third party or at the third party system 120. The provision of services through web services networks is known to those of skill in the art. Further, the stored confirmation messages can be used to create and generate reports relating to web service 210 activity or to confirm that SOAP messages were sent or received by either the consumer or the provider.

In Step S70, the provider side proxy application 220 decrypts the SOAP request. The decrypted SOAP request is then routed to a provider side SOAP server application 230.

In Step S80, the SOAP server application 230 parses the XML formatted SOAP requests and determines what information has been requested by the consumer. In one embodiment, the requested information is selected transaction card information such as transaction history and balance information for a store value card or gift card. Those of skill in the art will recognize that the requested information could be any other information relating to a transaction card that is stored and available from the provider computer system. Once, this determination has been made, the SOAP server application 230 creates an information request compatible with the provider back-end system 240 which is operating in a provider platform. The provider platform or operating system can be the same or different than the consumer platform. The information request created by the SOAP server application 230 is then routed to the provider's back-end system 240 for processing and retrieval of the requested information.

The steps of FIG. 1A continue and are shown in FIG. 1B as depicted by the bubble Step A which indicates that the web service method 100 continues over to FIG. 1B.

In Step S90, the information request is processed by the provider back-end system 240 via multiple transactions through designated computer resources and applications on the provider's internal network 250. The provider's internal resources 250 can access and retrieve the requested transaction card information directly from an appropriate database or storage location 270 or via a dedicated card server application 260 that can access and retrieve the requested transaction card information from an appropriate database or storage location 270 and pass it back through via the provider network resources and applications 250. The retrieved transaction card information is then routed to the provider SOAP server application 230.

In Step S100, the retrieved card information is converted to a standard XML format. The SOAP server application 230 then packages the retrieved information in an XML formatted SOAP reply and routes it to the provider side proxy application 220 at the web server 210.

In Step S110, the provider proxy application 220 will encrypt the received SOAP reply containing the retrieved information and include a digital signature in the SOAP reply uniquely corresponding to the provider.

In Step S120, the encrypted XML formatted SOAP reply with the provider's digital signature is transmitted or sent to the merchant's web server or web server application 10 over the internet 110. Simultaneously, an out-of-band message is generated by the provider side proxy application 220 and transmitted to the third party computer system or webs server application 120 for recordation that the SOAP reply was sent from the provider's web server application 210 to the consumer web server 10.

In Step S130, the consumer web server 10 receives the provider's SOAP reply at the merchant side proxy application 20. In Step S140, the consumer side proxy application 20 verifies the digital signature attached to the received SOAP reply corresponds to the information provider. The digital signature confirms that the provider sending the SOAP reply is coming from the information provider's web service 210 in response to the merchant's SOAP request.

Once the digital signature on the SOAP reply is verified, an out-of-band message is generated and transmitted to the third party computer system or web server application 120 for recordation that the provider information SOAP reply was received at the merchant's web server 10.

In Step S150, the merchant side proxy application 20 decrypts the received SOAP reply and generates the XML formatted SOAP reply. The decrypted SOAP reply is then forwarded to the consumer SOAP server or application 30.

In Step S160, the SOAP server application 30 processes the SOAP reply and routes the XML formatted transaction card information to the consumer back-end system 40. The received XML formatted transaction card information may include information such as stored value card transaction history and balance. The consumer could have also, if authorized, requested and received other transaction card information from the provider system.

The SOAP server application 30 is preferably a separate application from the consumer side proxy application 20 and may run on the same or separate machine or computer. However, if a SOAP server application was not used in the system 200, the functions of the SOAP server application 30 could be accomplished by the consumer side proxy application 20 by additional appropriate software on the consumer side proxy application 20. In such a case, the consumer proxy application 20 would process the SOAP reply and route the received XML formatted transaction card information to the consumer back-end system 40.

In Step S170, the XML formatted card information is received at intermediate applications or machines 50 in the consumer or merchant network 50 and then routed to consumer selected applications and devices 60 that can process and display the XML formatted card information. Alternatively, the XML formatted card information can be routed directly to the consumer selected applications and devices 60 for processing and displaying the XML formatted card information.

Since the requested information is received in the agreed upon standard format, i.e., in XML format, the merchant or consumer can process or manipulate the received information via existing applications 60 on the merchant's back end system 40. Further, the consumer or merchant can develop new applications and devices 60 to manipulate, process, store and display transaction card information from the provider system 202 since the information is received in a standardized XML format. As a result, the consumer or merchant can access the received information or data in a variety of devices and at many locations, including merchant retail locations, and present the information in an individualized manner suitable to the consumer, merchant, users and customers.

The received XML formatted information permits the consumer or merchant to display, process, store or integrate the received card information into existing applications including static or dynamic world wide web pages, which include among other applications web browsers, intranet, internet, and extranets, PowerPoint or Microsoft Word, smart card applications among other applications. The received XML formatted information can also be sent directly to end-point access devices having XML compatible applications, including among others merchant terminals, POS devices, cash registers, PDAs, smart cards, transaction cards having embedded smart chips or integrated circuit chips with data storage capability and kiosks that are provided by the merchant for processing and displaying.

Figure 3:
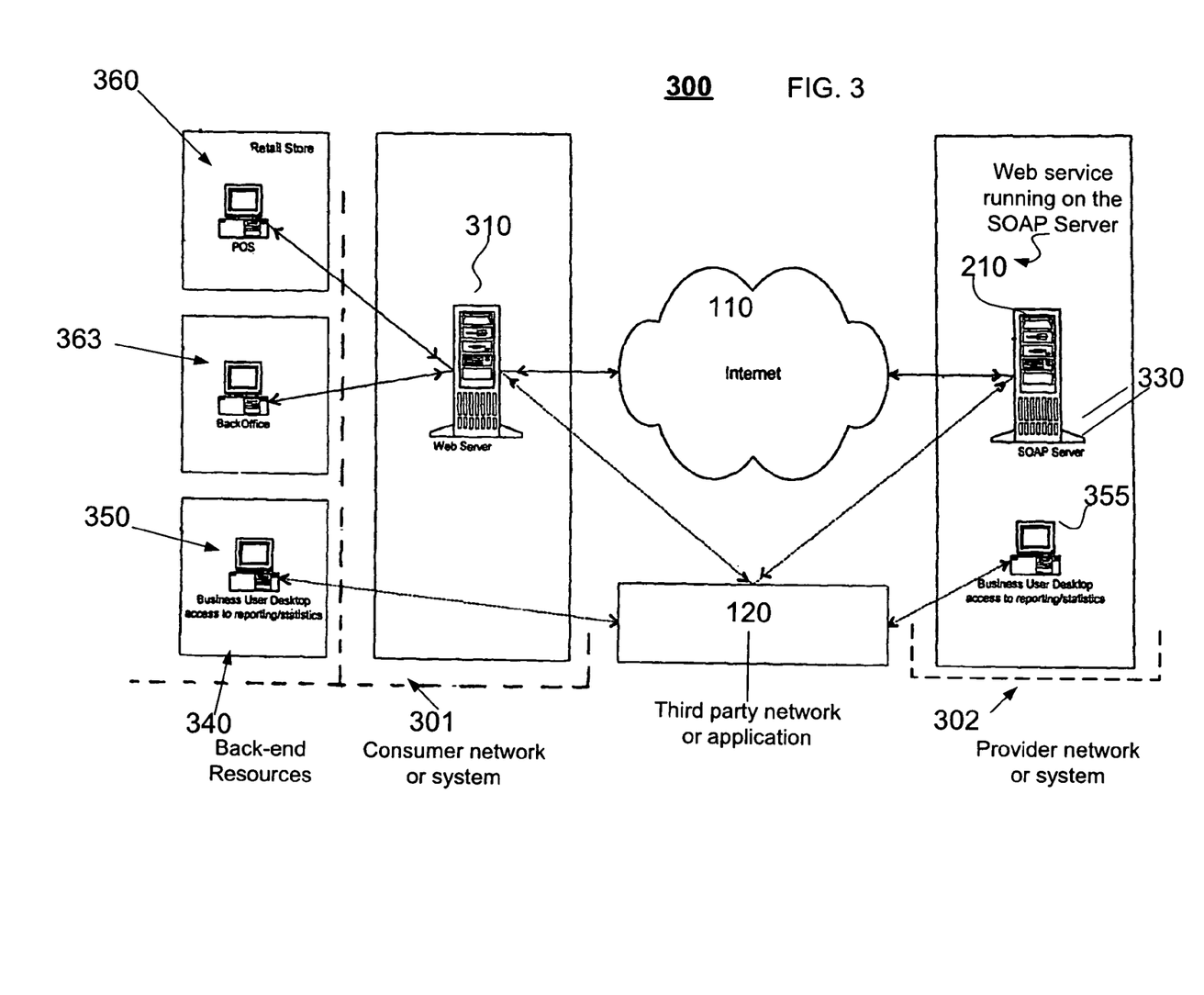
FIG. 3 illustrates a block diagram representation of a second system where the method of FIG. 1 can be implemented.

FIG. 3 shows a block diagram representation of a second system 300 where the method 100 of FIGS. 1A and 1B for retrieving stored value information over the internet 110 via a web service 210 can be implemented. The system 300 of FIG. 3 comprises a consumer network or system 301 operating on a first platform or operating system, and a provider network or system 302 operating on a second different platform or operating system.

The consumer network 301 comprises a web server 310 which can comprise a consumer side proxy application that connects the consumer network 301 to the internet 110. The web server 310 can also comprises a SOAP server application which would communicate with the back-end resources 340 in the consumer network 301, including a Point of Sale (POS) terminal or machine 360, and a back office computer or terminal 363. The POS machine 360 and the back office computer 363 can initiate a request for selected information from the provider web service 210 and can also process and display XML formatted information received from the provider web service 210. The consumer network 301 also comprises a computer or machine 350 that can communicate directly with the third part network or application 120 to conveniently access and requests reports and statistics relating to information requested and received from the provider web service 210.

The SOAP server application on the web server 310 will receive the back-end request for selected information and create an XML formatted SOAP request which will be forwarded to the consumer side proxy application on the web server 310. The consumer side proxy application will assign a transaction number to SOAP requests, encrypt and decrypt SOAP requests and replies, and transmits out-of band messages to the third party network or application indicating transmission or receipt of SOAP requests and replies. If no SOAP server application is included in the web server 310, the consumer side proxy application will also receive the back-end request for selected information and create an XML formatted SOAP request.

The information provider network 302 comprises a provider side SOAP server 330 with a SOAP server application and a web service application or provider side proxy application that connects the provider network 302 to the internet 110. The SOAP server application will communicate with the back-end resources of the information provider network 302. The provider side proxy application or web server application receives SOAP requests from the consumer network 301 and SOAP replies from the SOAP server application for processing. The provider side proxy application or web server application will encrypt and decrypt SOAP requests and replies and transmit out-of band messages to a third party network to indicate transmission or receipt of SOAP requests and replies. The SOAP server application will formulate requests for information and transmit the requests to the back-end system of the provider network 302. The back-end system of the provider system 302 will retrieved the requested information via multiple commands and means well known to those of ordinary skill in the art. The SOAP server application will then receive the retrieved information from the back-end system and formulate SOAP replies that are sent to the provider side proxy application.

Figure 4:
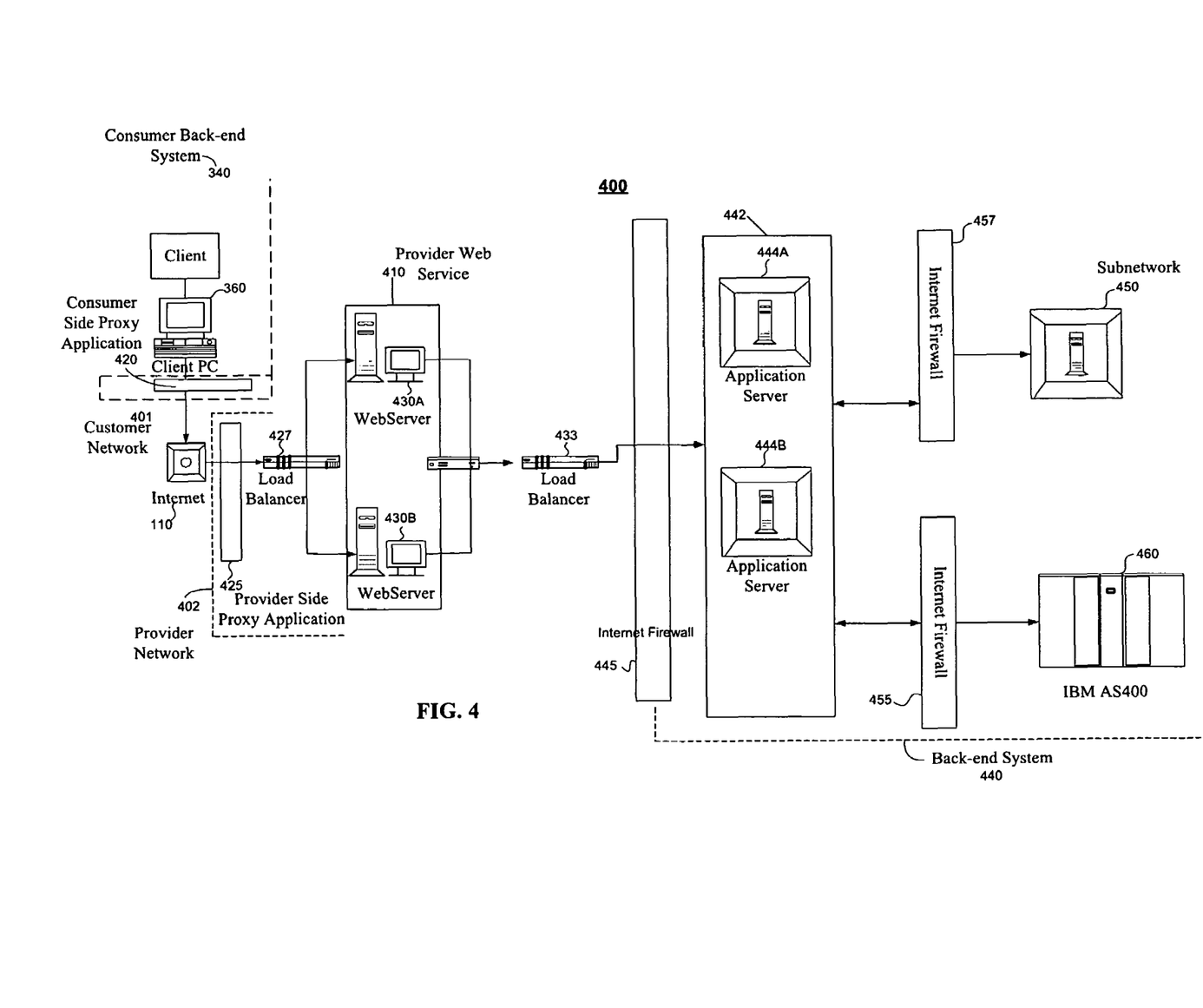
FIG. 4 illustrates a block diagram representation of a third system where the method of FIG. 1 can be implemented.

FIG. 4 shows a block diagram representation of a third system 400 where the method of FIGS. 1A and 1B for retrieving stored value information over the internet 110 via a web service 410 can be implemented The system 400 of FIG. 4 comprises a consumer network or system 401 operating on a first platform or operating system, and a provider network or system 402 operating on a second different platform or operating system.

The consumer network 401 comprises a consumer side proxy application 420 that resides on a web server that connects the consumer network 401 to the internet 110 and a client computer 360 in the consumer back-end system 340. The client computer 360 will initiate a request for selected information from the provider web service 410 and will also process and display XML formatted information received from the provider web service 410. The consumer side proxy application 420 receives requests for card information generated in the consumer system back-end 340 and creates an XML formatted SOAP request. The consumer side proxy application 420 assigns a transaction number to the SOAP requests, encrypts and decrypts SOAP requests and replies and transmits out-of band messages to a third party network indicating transmission or receipt of SOAP requests and replies.

The information provider network 402 comprises a provider side proxy application 425 that connects the provider network 402 to the internet 110 and that resides on a provider web server 410 or other server machine. The provider side proxy application 425 receives SOAP requests from the consumer network 401 and SOAP replies from the provider back-end system 440 and processes the requests and replies. The provider side proxy application 425 encrypts and decrypts SOAP requests and replies, and transmits out-of band messages to a third party network to indicate transmission or receipt of SOAP requests and replies. The provider side proxy application 425 will formulate SOAP replies when the provider network does not have a dedicated SOAP server application.

The provider network 402 also comprises a provider web service application 410 that can reside on two web servers 430A and 430B. The web servers 430A and 430B can execute redundant and identical applications and functions, or can execute specific non-redundant applications and functions. The web servers 430A and 430B provide the provider network's 402 connection to the internet 110 and will preferably each contain the provider side proxy application 425 which will receive and transmit all SOAP requests and replies. The web servers 430A and 430B may contain a SOAP server application to process SOAP requests and to formulate SOAP replies. If no SOAP server application is provided in the provider side network, the processing of SOAP requests and formulation of SOAP replies will be carried out by the provider side proxy application 425. Further, the provider web service application 410 is connected to a load balancer 427 which ensures that incoming traffic is routed to the appropriate web server 430A and 430B.

The provider web servers 430A and 430B are connected to a second load balancer 433 which will appropriately route a request for information through a first internal provider system firewall 445 which protectively controls the flow of information or messages to the back-end system 440 of the provider network 402. Having passed through the first firewall 445, requests for information are routed to one of two application servers 444A & 444B situated behind the first firewall 445. The application servers 444A & 444B can be redundant back-up to one another, or may be serve different portions 450 and 460 of the provider network 402. If the application servers 444A and 444B serve different portions 450 and 460 of the provider network 402, the load balancer 433 will route the request for information to the appropriate portion of the back-end system 440. Information requests proceed, through a second firewall 455 and 457, to the appropriate system resources and machines 450 and 460 in the back-end of the provider system 440 from which the requested information may be retrieved through multiple commands and means well known to those of ordinary skill in the art.

The invention has been described and illustrated with respect to certain preferred embodiments by way of example only. Those of ordinary skill in the art will recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

We claim:

1. A method for retrieving selected transaction card information associated with a transaction card in a standard format over a public interconnected network via a provider web service, comprising the steps of:
    formulating a simple object access protocol (SOAP) request for transaction card information;
    transmitting said SOAP request to said provider web service over the public interconnected network;
    receiving said SOAP request at said provider web service;
    reading said SOAP request to determine the transaction card information being requested;
    retrieving the transaction card information from a storage location and forwarding the transaction card information to said provider web service;
    formatting said transaction card information in an extensible markup language (XML) format and formulating a SOAP reply; and
    transmitting said SOAP reply over the public interconnected network to a consumer web server application;
    generating and transmitting an out-of-band message to a selected third party application indicating that said SOAP request was sent to said provider web service;
    generating and transmitting an out-of-band message to said selected third party application acknowledging that said SOAP request was received at said provider web service;
    generating and transmitting an out-of-band message to said selected third party application indicating that said SOAP reply was sent to said consumer web server application; and
    generating and transmitting an out-of-band message to said selected third party application acknowledging that said SOAP reply was received at said consumer web server application;
    whereby said third party application stores a plurality of received messages confirming that said SOAP request and said SOAP reply were transmitted and received by a consumer and provider network.

2. The method of claim 1, further comprising the steps of:
    receiving said SOAP reply at the consumer web server application;
    reading said SOAP reply to parse out said XML formatted transaction card information; and
    routing said XML formatted transaction card information to one or more consumer back-end applications or end-point access devices.

3. The method of claim 1, further comprising the steps of:
    prior to transmitting said SOAP request, encrypting said SOAP request, and providing said SOAP request with a consumer digital signature;
    after receiving said SOAP request, verifying that said consumer digital signature on said received encrypted SOAP request corresponds to an authorized consumer and then decrypting said SOAP request;

prior to transmitting said SOAP reply, encrypting said SOAP reply, and providing said SOAP reply with a provider digital signature; and after receiving said SOAP reply, verifying that said provider digital signature on said received encrypted SOAP reply corresponds to said provider web service, and then decrypting said SOAP reply.

4. The method of claim 1, wherein said transaction card is at least one of a stored value card, a gift card, a credit card, a smart card, a bank card, a charge card and a financial card.

5. The method of claim 1, wherein said transaction card information is card transaction history and balance of said transaction card.

6. A method for retrieving selected transaction card information associated with a transaction card in a standard format over a public interconnected network via a provider web service, comprising the steps of:

formulating a simple object access protocol (SOAP) request for transaction card information at a consumer web server application in a consumer network operating on a first platform;

transmitting said SOAP request to the provider web service over the public interconnected network;

receiving said SOAP request at a provider web service application of the provider web service;

reading said SOAP request to determine the transaction card information being requested;

generating and routing an internal information request based on said received SOAP request to a provider back-end network operating on a second platform;

retrieving said transaction card information from a storage location and forwarding the transaction card information to said provider web service application;

formatting said retrieved transaction card information in an extensible markup language (XML) format and formulating a SOAP reply containing said XML formatted transaction card information;

transmitting said SOAP reply to said consumer web server application over the public interconnected network;

receiving said SOAP reply at said consumer web server application;

reading said SOAP reply to parse out said XML formatted transaction card information;

routing said XML formatted transaction card information to one or more consumer back-end applications or end-point access devices;

generating and transmitting an out-of-band message to a selected third party application indicating that said SOAP request was sent to said provider web service application;

generating and transmitting an out-of-band message to said selected third party application acknowledging that said SOAP request was received at said provider web service application;

generating and transmitting an out-of-band message to said selected third party application indicating that said SOAP reply was sent to said consumer web server application; and generating and transmitting an out-of-band message to said selected third party application acknowledging that said SOAP reply was received at said consumer web server application;

whereby said third party application stores a plurality of received messages confirming that said SOAP request and said SOAP reply were transmitted and received by a consumer and provider network.

7. The method of claim 6, further comprising:

prior to transmitting said SOAP request to said provider web service, encrypting said SOAP request, and providing said SOAP request with a consumer digital signature;

after receiving said SOAP request at said provider web service application, verifying that said consumer digital signature on said received encrypted SOAP request corresponds to an authorized consumer and then decrypting said SOAP request;

prior to transmitting said SOAP reply to said consumer web server application, encrypting said SOAP reply, and providing said SOAP reply with a provider digital signature; and after receiving said SOAP reply at said consumer web server application, verifying that said provider digital signature on said received encrypted SOAP reply corresponds to said provider web service, and then decrypting said SOAP reply.

8. The method of claim 6, wherein said transaction card is at least one of a stored value card, a gift card, a credit card, a smart card, a bank card, a charge card and a financial card.

9. The method of claim 6, wherein said selected transaction card information is card transaction history and balance of said transaction card.

10. The method of claim 6, where said first platform and said second platforms are different operating systems.

11. A method for retrieving selected transaction card information associated with a transaction card in a standard format over a public interconnected network via a provider web service, comprising the steps of:

formulating a simple object access protocol (SOAP) request for transaction card information;

transmitting said SOAP request to the provider web service over the public interconnected network;

receiving said SOAP request at the provider web service;

reading said SOAP request to determine the transaction card information being requested;

retrieving the transaction card information from a storage location and forwarding the transaction card information to said provider web service;

formatting said transaction card information in an extensible markup language (XML) format and formulating a SOAP reply; and transmitting said SOAP reply over the public interconnected network;

receiving said SOAP reply at a consumer web server application;

reading said SOAP reply to parse out said XML formatted transaction card information;

routing said XML formatted transaction card information to one or more consumer back-end applications or end-point access devices;

prior to transmitting said SOAP request, encrypting said SOAP request, and providing said SOAP request with a consumer digital signature;

after receiving said SOAP request, verifying that said consumer digital signature on said received encrypted SOAP request corresponds to an authorized consumer and then decrypting said SOAP request;

prior to transmitting said SOAP reply, encrypting said SOAP reply, and providing said SOAP reply with a provider digital signature;

after receiving said SOAP reply, verifying that said provider digital signature on said received encrypted SOAP reply corresponds to said provider web service, and then decrypting said SOAP reply;

generating and transmitting an out-of-band message to a selected third party application indicating that said SOAP request was sent to said provider web service;

generating and transmitting an out-of-band message to said selected third party application acknowledging that said SOAP request was received at said provider web service;

generating and transmitting an out-of-band message to said selected third party application indicating that said SOAP reply was sent to said consumer web server application;

generating and transmitting an out-of-band message to said selected third party application acknowledging that said SOAP reply was received at said consumer web server application;

whereby said third party application stores a plurality of received messages confirming that said SOAP request and said SOAP reply were transmitted and received by a consumer and provider network.

12. A method for retrieving selected transaction card information associated with a transaction card in a standard format over a public interconnected network via a provider web service, comprising the steps of:

formulating a simple object access protocol (SOAP) request for transaction card information at a consumer web server application in a consumer network operating on a first platform;

transmitting said SOAP request to the provider web service over the public interconnected network;

receiving said SOAP request at a provider web service application of the provider web service;

reading said SOAP request to determine the transaction card information being requested;

generating and routing an internal information request based on said received SOAP request to a provider back-end network operating on a second platform;

retrieving said transaction card information from a storage location and forwarding the transaction card information to said provider web service application;

formatting said retrieved transaction card information in an extensible markup language (XML) format and formulating a SOAP reply containing said XML formatted transaction card information;

transmitting said SOAP reply to said consumer web server application over the public interconnected network;

receiving said SOAP reply at said consumer web server application;

reading said SOAP reply to parse out said XML formatted transaction card information;

routing said XML formatted transaction card information to one or more consumer back-end applications or end-point access devices;

prior to transmitting said SOAP request to said provider web service, encrypting said SOAP request, and providing said SOAP request with a consumer digital signature;

after receiving said SOAP request at said provider web service application, verifying that said consumer digital signature on said received encrypted SOAP request corresponds to an authorized consumer and then decrypting said SOAP request;

prior to transmitting said SOAP reply to said consumer web server application, encrypting said SOAP reply, and providing said SOAP reply with a provider digital signature; and after receiving said SOAP reply at said consumer web server application, verifying that said provider digital signature on said received encrypted SOAP reply corresponds to said provider web service, and then decrypting said SOAP reply;

generating and transmitting an out-of-band message to a selected third party application indicating that said SOAP request was sent to said provider web service application;

generating and transmitting an out-of-band message to said selected third party application acknowledging that said SOAP request was received at said provider web service application;

generating and transmitting an out-of-band message to said selected third party application indicating that said SOAP reply was sent to said consumer web server application;

generating and transmitting an out-of-band message to said selected third party application acknowledging that said SOAP reply was received at said consumer web server application;

whereby said third party application stores a plurality of received messages confirming that said SOAP request and said SOAP reply were transmitted and received by a consumer and provider network.

* * * * *

UNITED STATES PATENT AND TRADEMARK OFFICE
CERTIFICATE OF CORRECTION

PATENT NO.         : 7,342,918 B2
APPLICATION NO. : 10/414174
DATED                  : March 11, 2008
INVENTOR(S)       : Sean M. Keenan et al.

It is certified that error appears in the above-identified patent and that said Letters Patent is hereby corrected as shown below:

TITLE PAGE ITEM [56] REFERENCES CITED

Other Publications
    After Security Focus: "URL:hh\ttp://www.security focus.com/library/3900>."
        should read --URL:http://www.securityfocus.com/library/3900>--.

COLUMN 2

Line 17, "want to" should read --want the--.

COLUMN 5

Line 10, "use" should read --used--.

COLUMN 7

Line 28, "that the" should read --that--.

COLUMN 8

Line 56, "webs" should read --web--.

COLUMN 10

Line 10, "comprises" should read --comprise--.
    Line 54, "retrieved" should read --retrieve--.
    Line 63, "implemented" should read --implemented.--.

COLUMN 11

Line 59, "may be" should read --maybe--.

COLUMN 12

Line 30, "reply; and" should read --reply;--.
    Line 47, "application;" should read --application,--.

UNITED STATES PATENT AND TRADEMARK OFFICE
CERTIFICATE OF CORRECTION

PATENT NO. : 7,342,918 B2
APPLICATION NO. : 10/414174
DATED : March 11, 2008
INVENTOR(S) : Sean M. Keenan et al.

It is certified that error appears in the above-identified patent and that said Letters Patent is hereby corrected as shown below:

COLUMN 13

Line 63 claim 6, "application;" should read --application,--.

COLUMN 14

Line 44 claim 11, "reply; and" should read --reply;--.

COLUMN 15

Line 11 claim 11, "application;" should read --application; and--.
Line 15, "application;" should read --application,--.

COLUMN 16

Line 20 claim 12, "signature; and" should read --signature;--.
Line 37, "application;" should read --application; and--.
Line 41, "application;" should read --application,--.

Signed and Sealed this

Twenty-ninth Day of July, 2008

JON W. DUDAS
*Director of the United States Patent and Trademark Office*